April 11, 1950   C. H. JORGENSEN ET AL   2,503,274
ENGINE PRESSURE REGULATOR
Filed June 11, 1945   13 Sheets-Sheet 5

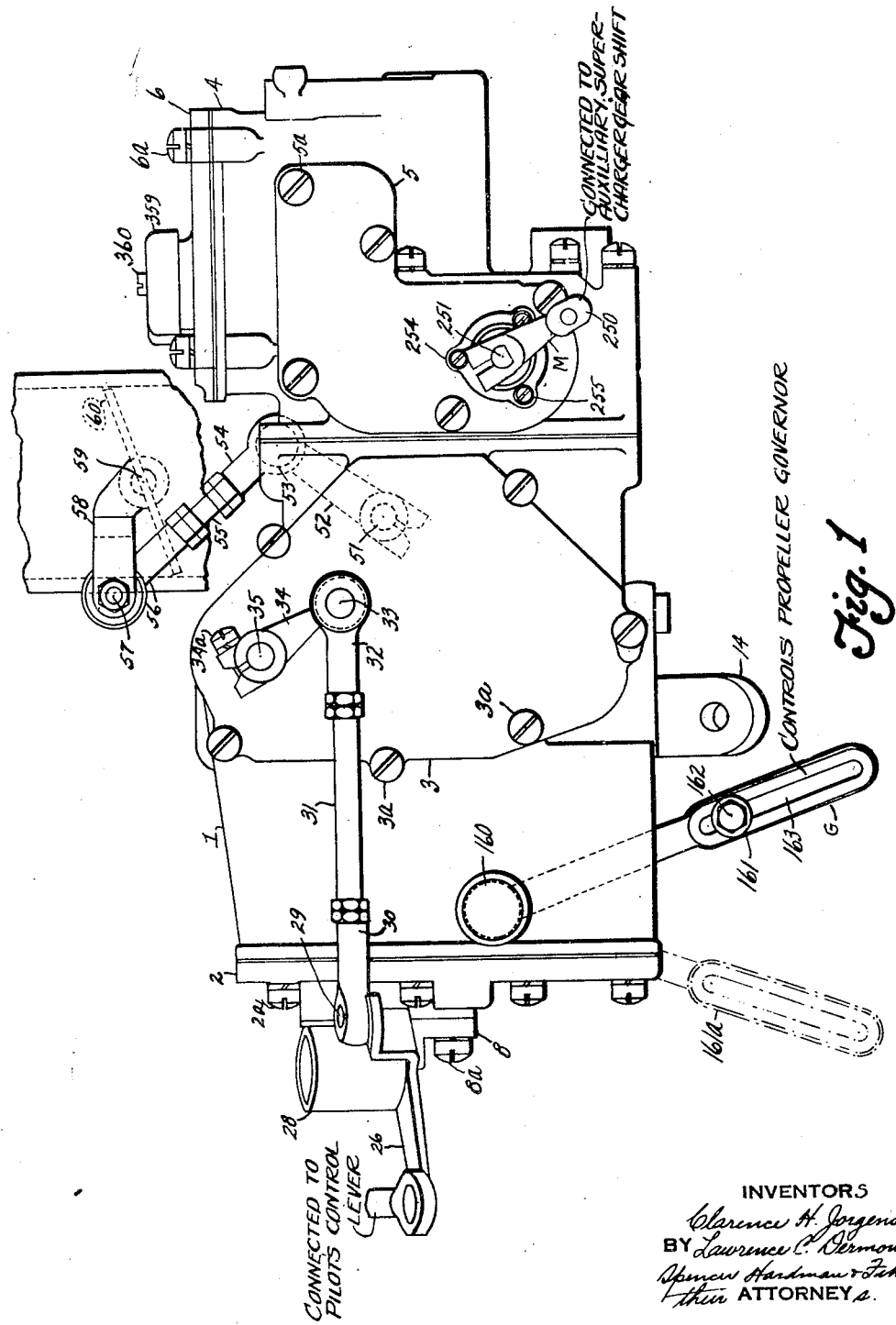

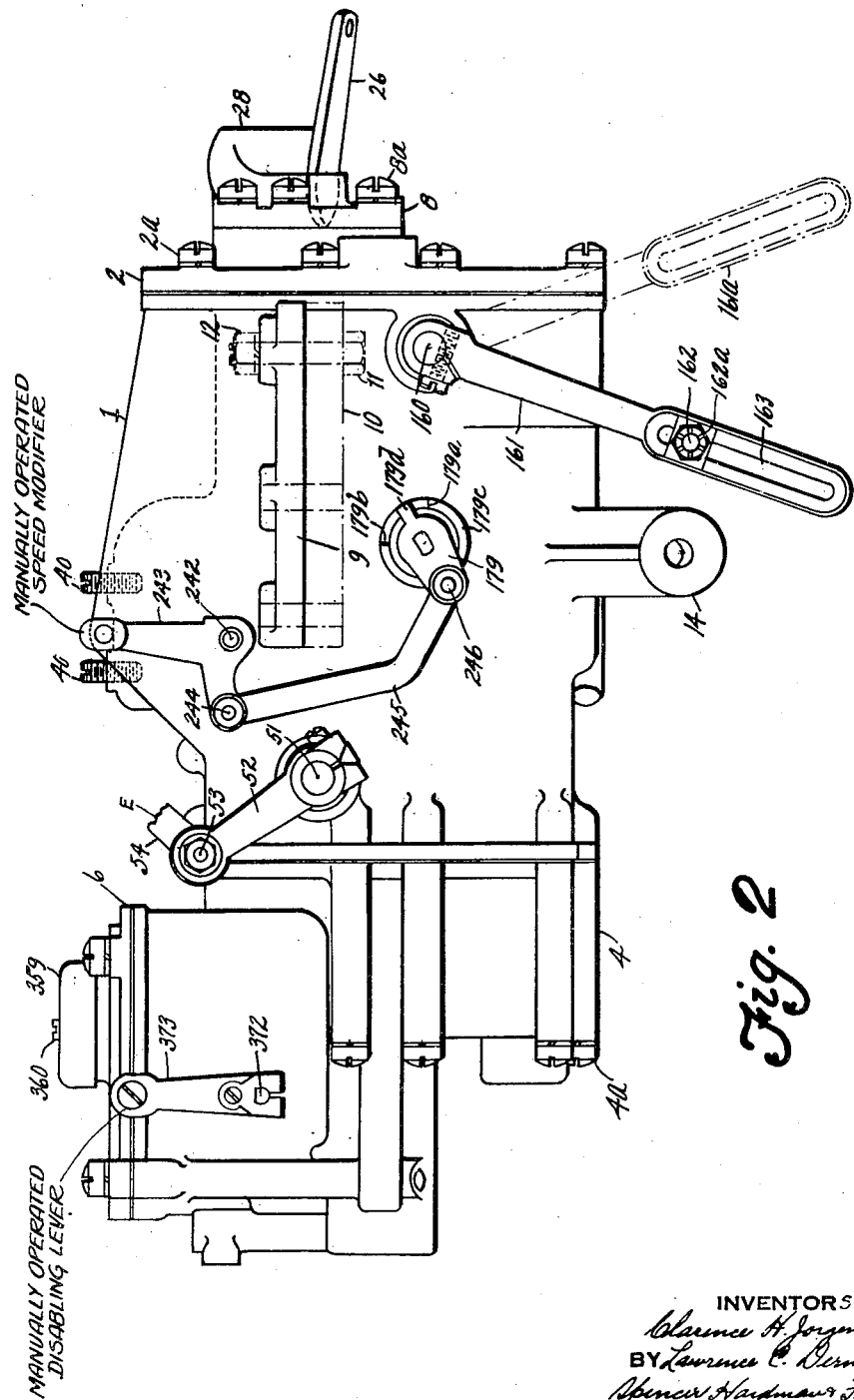

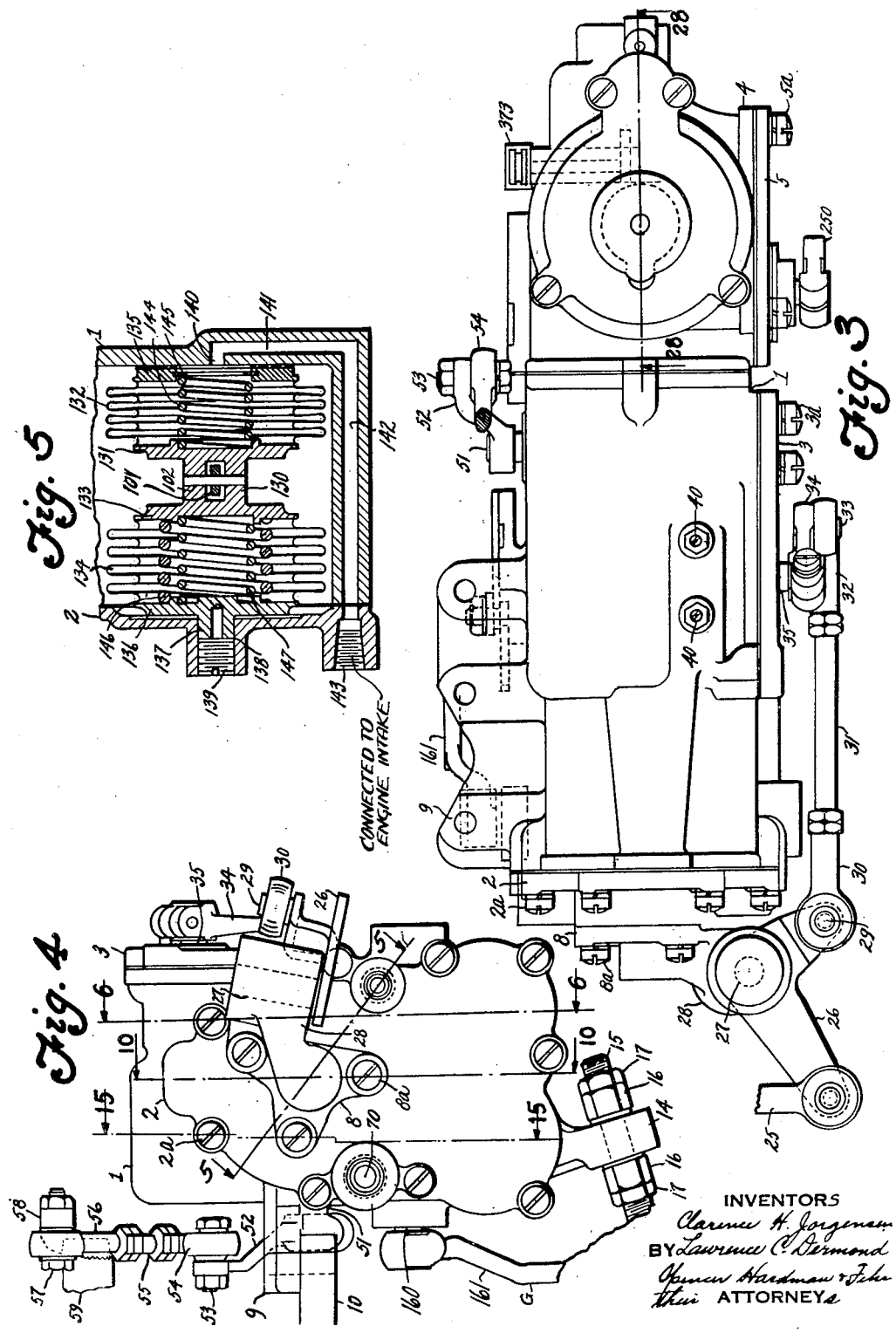

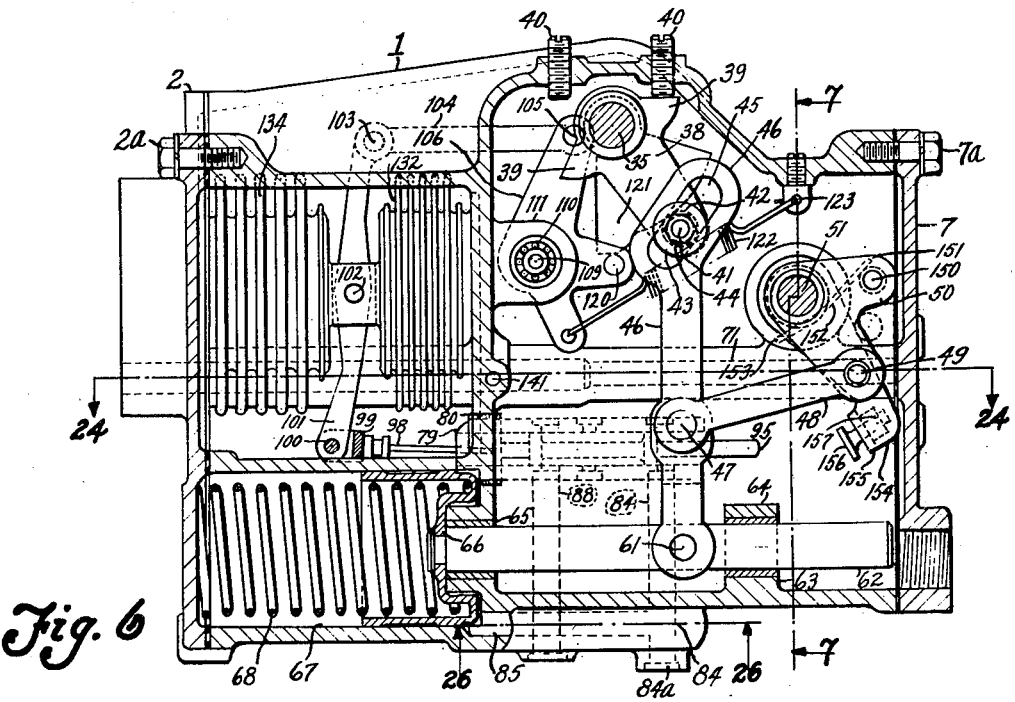

INVENTORS
Clarence H. Jorgensen
Lawrence C. Ormond
BY
Spencer, Hardman & Feles
their ATTORNEYS

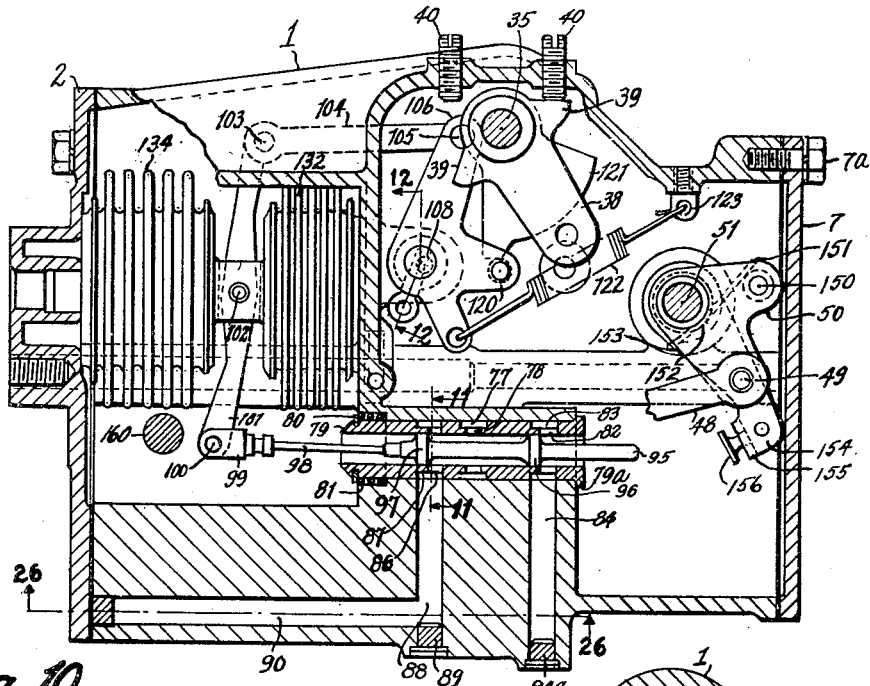

April 11, 1950     C. H. JORGENSEN ET AL     2,503,274
ENGINE PRESSURE REGULATOR
Filed June 11, 1945     13 Sheets-Sheet 7
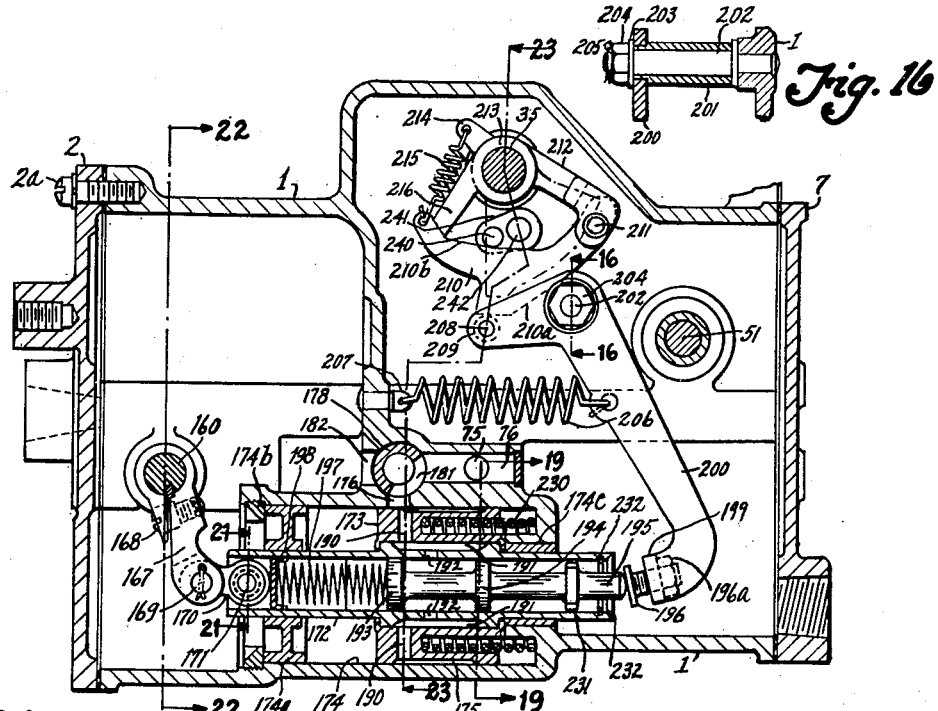
Fig. 15
Fig. 16
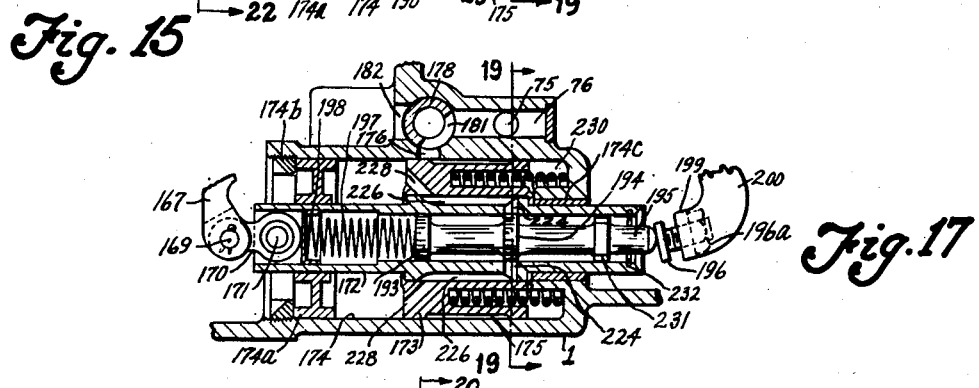
Fig. 17
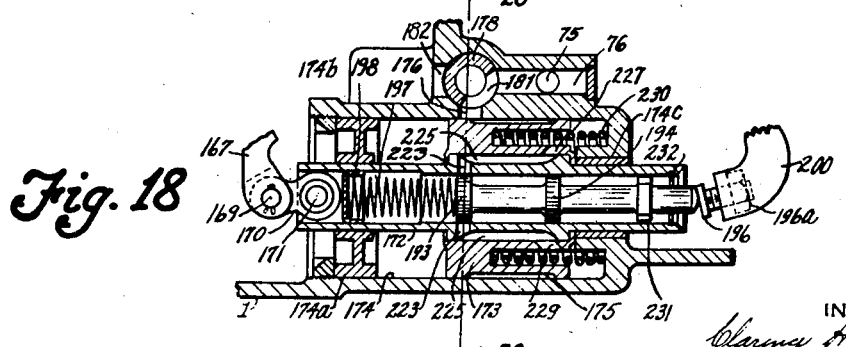
Fig. 18
INVENTORS
Clarence H. Jorgensen
BY Lawrence C. Dermond
Spencer Hardman & Fehr
their ATTORNEYS April 11, 1950
C. H. JORGENSEN ET AL
2,503,274
ENGINE PRESSURE REGULATOR
Filed June 11, 1945
13 Sheets-Sheet 8
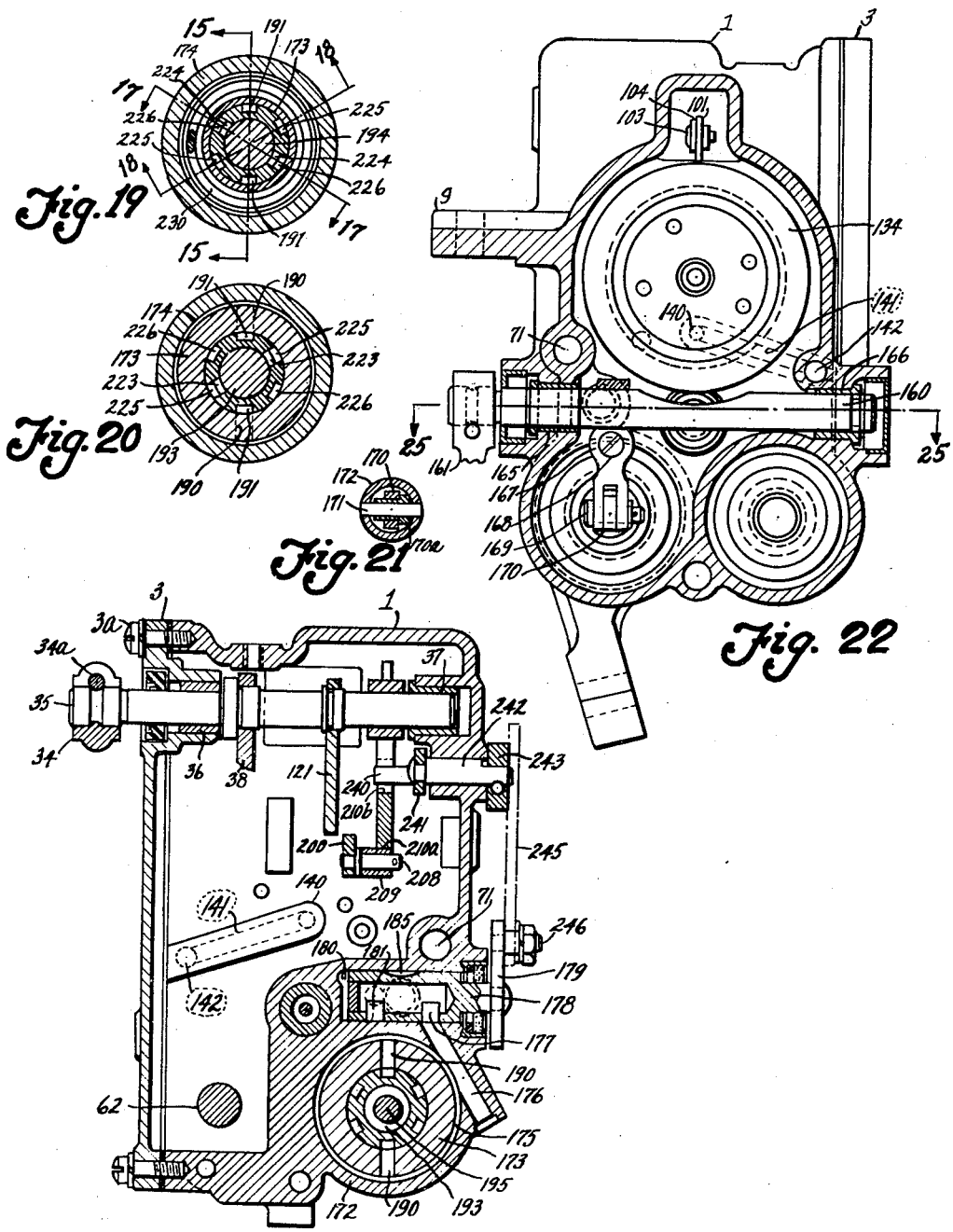
INVENTORS
Clarence H. Jorgensen
Lawrence C. Dermond
BY Spencer Hardman & Fehr
their ATTORNEYS April 11, 1950  C. H. JORGENSEN ET AL  2,503,274
ENGINE PRESSURE REGULATOR
Filed June 11, 1945  13 Sheets-Sheet 9

INVENTOR
Clarence H. Jorgensen
Laurence C. Dermond
BY
Spencer Hardman Fehr
their ATTORNEYS

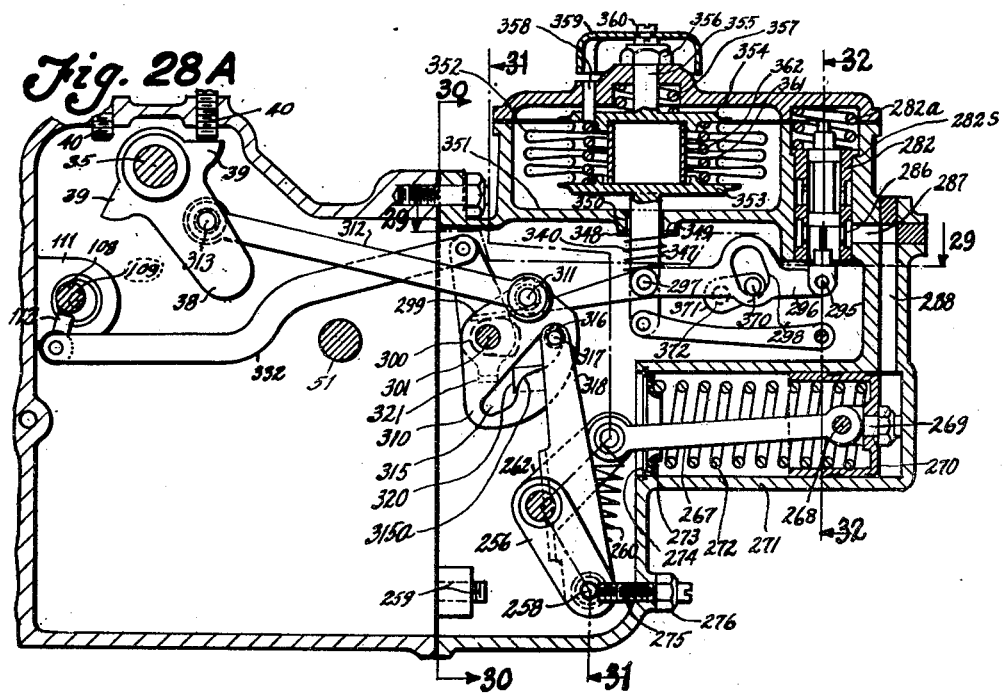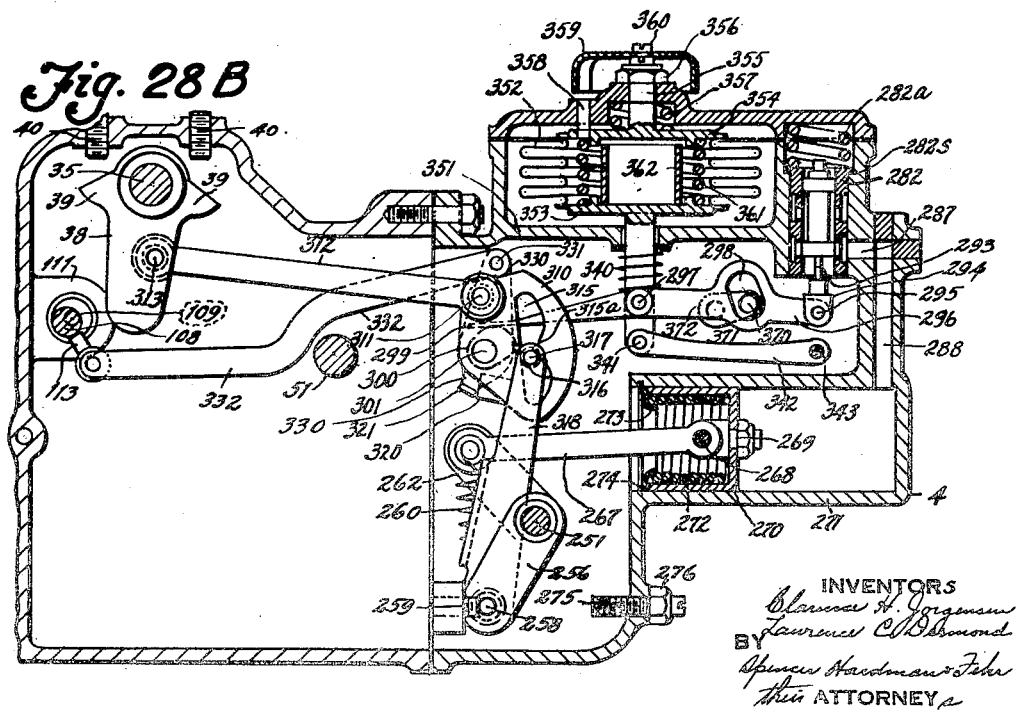

April 11, 1950   C. H. JORGENSEN ET AL   2,503,274
ENGINE PRESSURE REGULATOR
Filed June 11, 1945   13 Sheets-Sheet 11
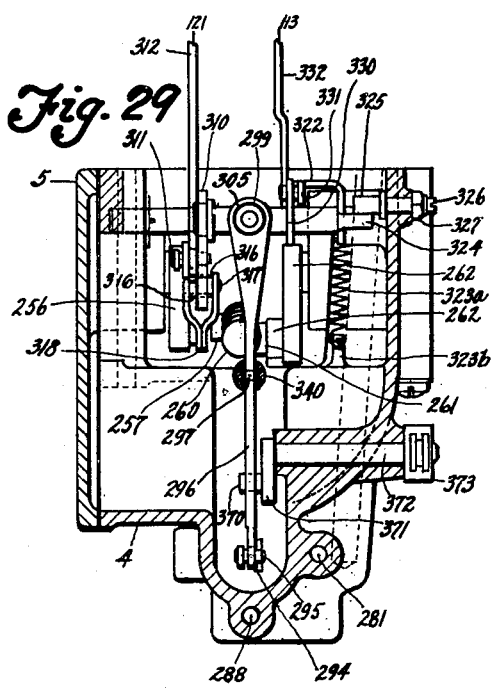
Fig. 29
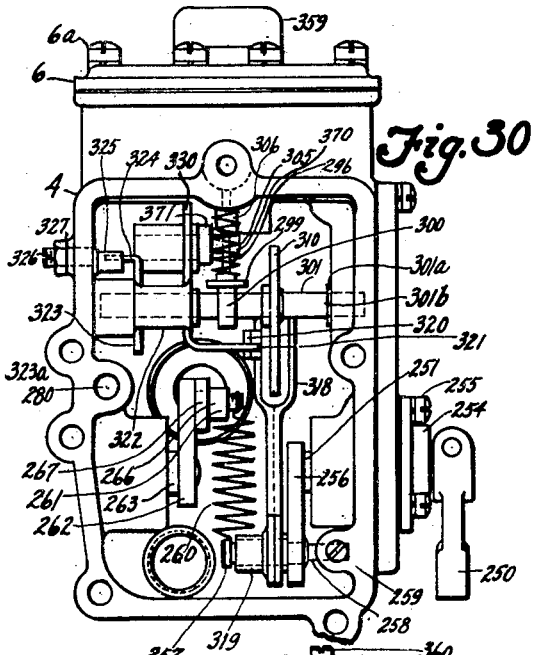
Fig. 30
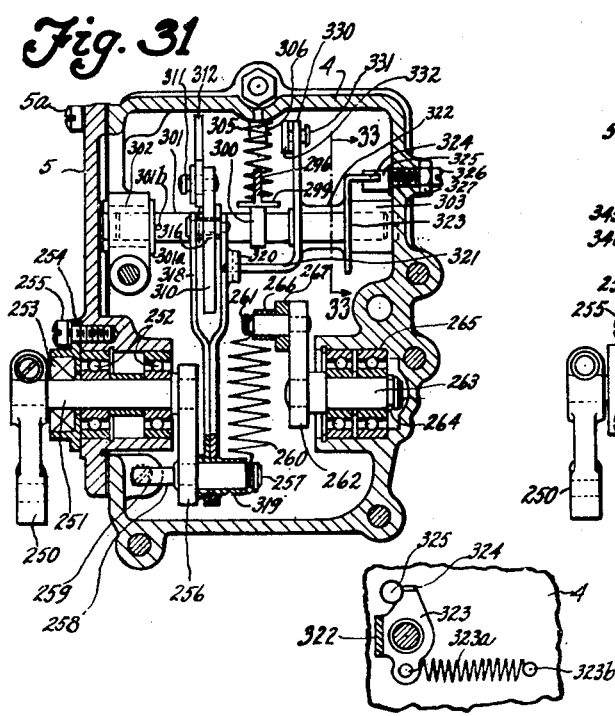
Fig. 31
Fig. 33
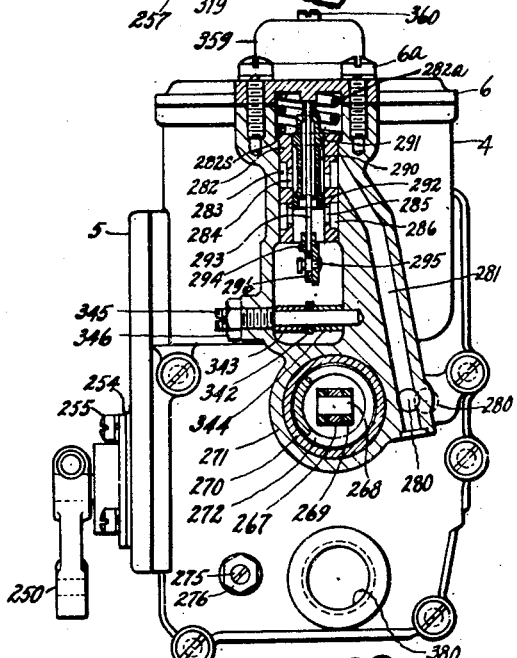
Fig. 32
INVENTOR
Clarence H. Jorgensen
BY Lawrence C. Dermond
Spencer Hardman & Fehr
their ATTORNEYS

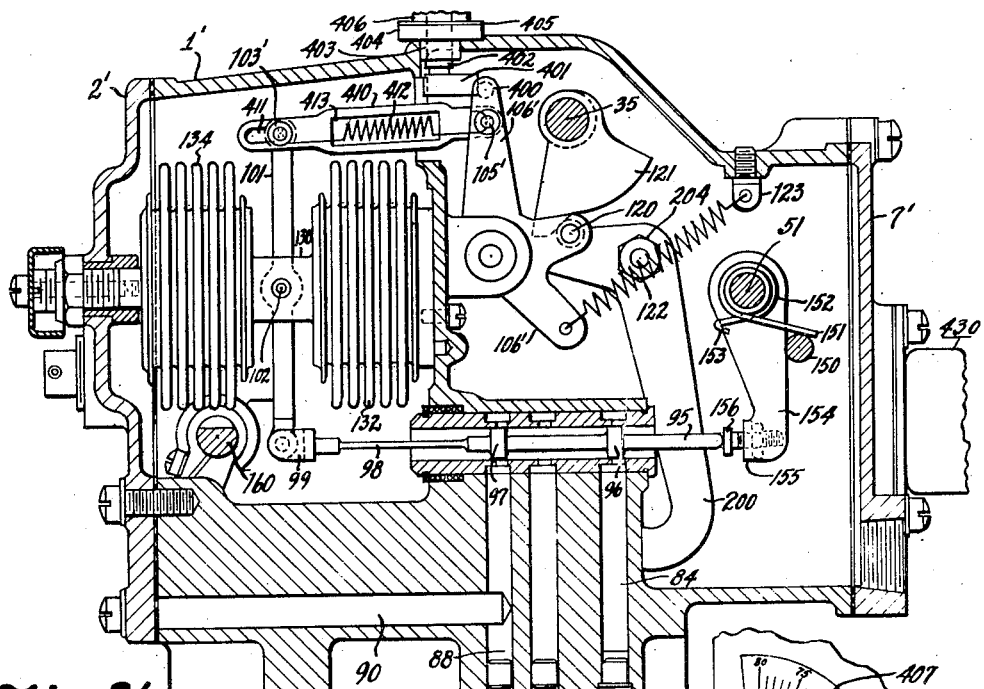

Patented Apr. 11, 1950

2,503,274

UNITED STATES PATENT OFFICE 2,503,274

ENGINE PRESSURE REGULATOR

Clarence H. Jorgensen and Lawrence C. Dermond, Rochester, N. Y., assignors to General Motors Corporation, Detroit, Mich., a corporation of Delaware Application June 11, 1945, Serial No. 598,768

20 Claims. (Cl. 123—103)

This invention relates to apparatus for controlling the intake pressure of a supercharged internal combustion airplane engine. More particularly, the invention relates to control apparatus having a manually operated means for selecting a pressure to be maintained in the engine intake, a device responsive to intake pressure, and a servo-motor under joint control by said means and device for adjusting the throttle valve of the engine so as to correct for divergencies of intake pressure from the selected pressure. The throttle valve is under manual control as well as control by the servo-motor to the extent that a safe landing may be made in case of failure of control by the servo-motor.

One object of the present invention is to provide that the sum of the manually effected throttle movement and the movement effected by the servo-motor shall bring the throttle to wide-open position at critical altitude for all pressure selections in the flight range from minimum cruise pressure to highest pressure. In the disclosed embodiment of this invention, this object is accomplished by providing an hydraulic servo-motor that is capable of adding to the manually effected movement of the throttle an automatic movement greater than required to bring the throttle to wide-open position for all pressure selections above minimum cruise pressure, and by providing means responsive to the wide-opening of the throttle for arresting further operation of the servo-motor through the use of an hydraulic check or lock.

Other objects of the present invention are to provide for the coordination of control of the propeller pitch governor with the selection of pressure to be maintained whereby the governed engine or propeller speeds can be varied with change of pressure selection according to a predetermined schedule, to provide manually controlled means for modifying the schedule between certain values of pressure selection, used for part-load operation, by changing the governed speeds of the engine in relation to pressure selection, and to provide for nullifying the effect of the modifier when the pressure selections are other than for part load, such other pressure selections being for example, the selections required for idling or for maximum power. These objects are accomplished in the disclosed embodiment of the invention by an hydraulic servo-motor connected with the control member of the propeller pitch governor, the stroke of the servo-motor being determined by the location of a valve which is positioned by a rotary cam coordinated with the manually operated pressure selecting means. The action of the cam is modified by manually controlled means which operates to effect a movement of the cam laterally with respect to its axis as the cam is rotated between certain angular positions.

Another object is to provide for manually rendering inoperative the conditioning of the propeller pitch governor control by the cam in order that the pilot may control the governor manually when desired. In one form of the invention this is accomplished by moving the manually operated member which modifies the schedule of engine governed speeds vs. pressure selections in a direction opposite that required for its modifying function. In another form, this is accomplished by a manually controlled electromagnet. In both forms of the invention, when conditioning of the governor control by the cam is rendered inoperative, a spring automatically returns the governor control to a condition called for highest governed speed for purpose of checking the ignition magneto.

A further object of the invention is to coordinate the intake pressure controller and speed regulator with a means for actuating the speed controller of an auxiliary supercharger, for example, one which is driven by the engine through change-speed gearing capable of being shifted from low speed to high speed by a control lever. More particularly, an object is to effect the shifting from low speed to high speed automatically according to a predetermined schedule of altitudes and pressure selections and to effect automatically, in response to the shift into high gear, an increase of pressure over the selected pressure, which increase varies according to a predetermined schedule of selected pressures and pressure increases.

A further object of the invention is to provide control unit having a housing containing the mechanisms for effecting throttle control jointly by manual and by servo-motor operations and for effecting the coordinated control of engine governed speed, the operating parts being completely enclosed except as to certain levers, such as the manually operated lever which operates the throttle valve and selects the pressure, the throttle valve operating lever, the lever which is connected with the propeller pitch governor control member and the speed modifying lever. In this connection it is an object to provide a gear-shift operating unit which has a housing containing the operating parts which are completely enclosed except as to the lever connectible with the change-speed operating member and a manually operated lever for rendering the unit inoperative at will. The gear-shift operating unit may be combined with the pressure and speed control unit by joining their housings after making the necessary connections required for coordinating pressure selection with gear-shift control and for coordinating shift into high gear with pressure increase.

Further objects and advantages of the present invention will be apparent from the following description, reference being had to the accompanying drawings, wherein preferred embodiments of the present invention are clearly shown.

In the drawings:

Fig. 1 is a side view of the pressure and speed controller combined with the gear-shift unit.

Fig. 2 is a view of the side opposite that shown in Fig. 1.

Fig. 3 is a plan view of the apparatus shown in Figs. 1 and 2.

Fig. 4 is an end view in the direction of the arrow 4 of Fig. 1.

Figs. 5 through 27 illustrate only the pressure and speed control unit.

Fig. 5 is a sectional view on line 5—5 of Fig. 4.

Fig. 6 is a sectional view on line 6—6 of Fig. 4.

Fig. 7 is a sectional view on line 7—7 of Fig. 6.

Fig. 7a is a continuation of Fig. 7.

Figs. 8 and 9 are views similar to Fig. 6 showing parts in other positions of operation.

Fig. 10 is a sectional view on line 10—10 of Fig. 4.

Fig. 11 is an enlarged sectional view on line 11—11 of Fig. 10.

Fig. 12 is an enlarged sectional view on line 12—12 of Fig. 10.

Fig. 13 is an enlarged sectional view on line 13—13 of Fig. 12.

Fig. 14 is an enlarged end view in the direction of arrow 14 of Fig. 12.

Fig. 15 is a sectional view on line 15—15 of Figs. 4 and 19.

Fig. 16 is a sectional view on line 16—16 of Fig. 15.

Fig. 17 is a sectional view on line 17—17 of Fig. 19.

Fig. 18 is a sectional view on line 18—18 of Fig. 19.

Fig. 19 is a sectional view on line 19—19 of Figs. 15 and 17.

Fig. 20 is a sectional view on line 20—20 of Fig. 18.

Fig. 21 is a sectional view on line 21—21 of Fig. 15.

Fig. 22 is a sectional view on line 22—22 of Fig. 15.

Fig. 23 is a sectional view on line 23—23 of Fig. 15.

Fig. 24 is a sectional view on line 24—24 of Fig. 6.

Fig. 25 is a sectional view on line 25—25 of Fig. 22.

Fig. 26 is a sectional view on line 26—26 of Figs. 6 and 10.

Fig. 27 is a plan view of the operating mechanism with the housing in section.

Figs. 28A, 28B, 29 through 33 illustrate the gear-shift operating unit.

Figs. 28A and 28B are similar sectional views on line 28—28 of Fig. 3. These views differ with respect to the positions of certain parts.

Figs. 29, 30, 31 and 32 are sectional views taken respectively on lines 29—29, 30—30, 31—31 and 32—32 of Fig. 28A.

Fig. 33 is a sectional view on line 33—33 of Fig. 31.

Figures 34, 35:
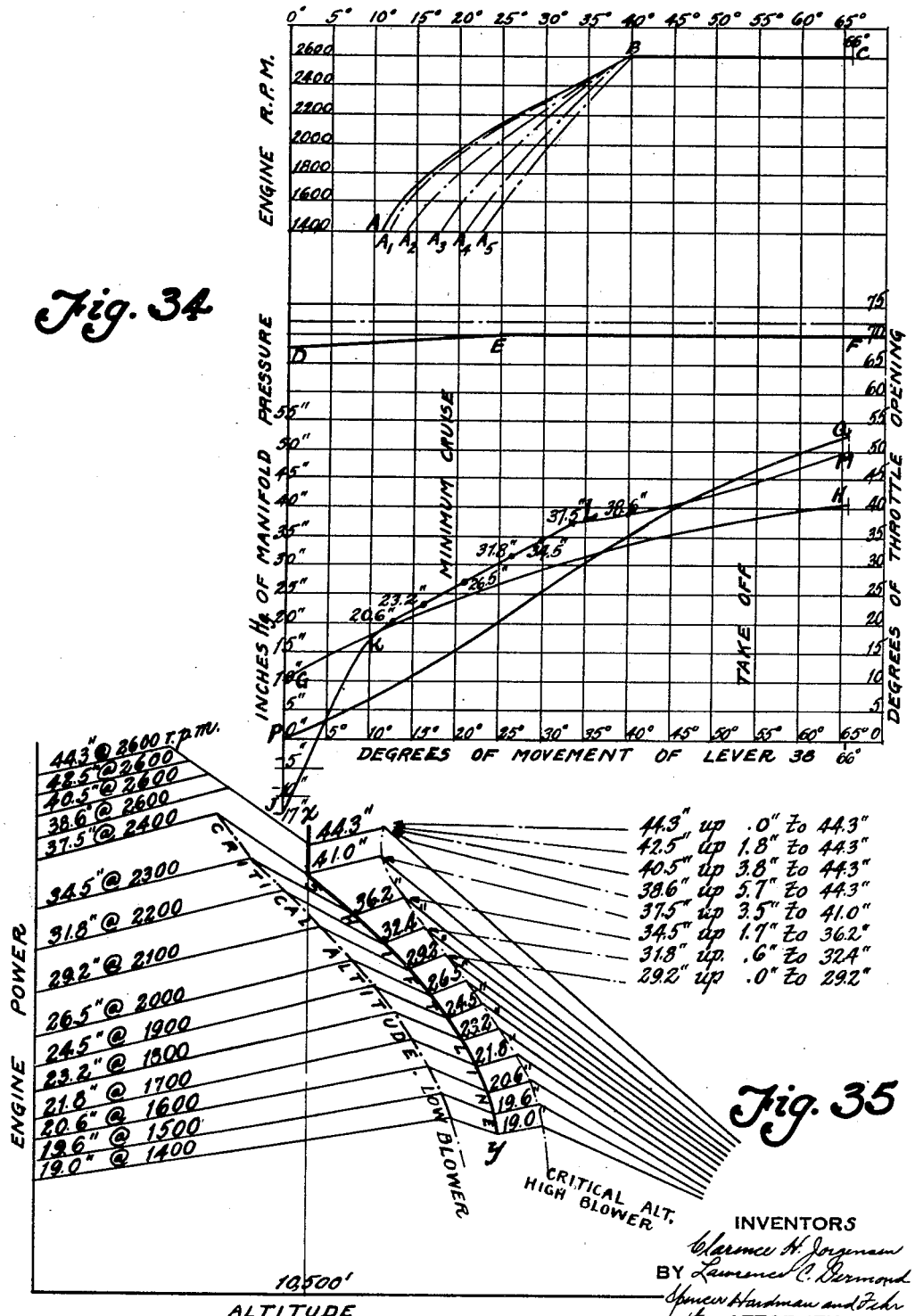

Fig. 34 is a chart showing the mode of operation of the pressure and speed controller.

Fig. 35 is a chart showing the mode of operation of the gear-shift operating unit.

Figs. 36 and 37 are sectional views similar to Figs. 10 and 15, respectively, and show modified forms of the invention.

Fig. 38 is a fragmentary plan view of Fig. 36.

Fig. 1 shows a housing 1 to which an end cover 2 is attached by screws 2a, to which a side cover 3 is attached by screws 3a, to which either a housing 4 may be attached by screws 4a or to which a cover 7 (Fig. 6) may be attached by screws 7a. To the housing 4, there is attached a side cover 5 by screws 5a and a top cover 6 by screws 6a. To the cover 2 (left of Fig. 1) there is attached a bracket 8 by screws 8a. Fig. 2 shows bracket 9, integral with housing 1, which may be attached to a support 10 by bolts 11 and nuts 12. (Parts 10, 11 and 12 are indicated in dot-dash-lines in Fig. 2 since they are not a part of the unitary structure.) Fig. 7 shows a bracket 14 integral with housing 1 to which a rod 15 is secured by nuts 16 and 17. Fig. 7a shows that the rod 15 has a cup-like spherical end 18 received by a spherical socket in a fixed support 19 and secured thereto by a stud 20 and a nut 21, there being a washer 18a between the nut 21 and the part 18, said washer 18a having a spherical under-surface.

The pilot's control lever (not shown) is connected with the controller by mechanism including a link 25 (Fig. 3 left), a bell-crank lever 26 attached to a shaft 27 journalled in a bearing boss 28 integral with bracket 8, a pin 29, adjustable link parts 30, 31 and 32, a pin 33, a lever 34 and the main control shaft 35. Shaft 35 is journalled in a bearing 36 (Fig. 23) provided by the cover 3 and in a bearing 37 provided by the housing 1. Shaft 35 drives a lever 38 (Fig. 6) having stop lugs 39 for engaging adjustable stop screws 40 threaded in housing 1.

Lever 38 carries a stud 41 pivotally supporting a roller 42 retained by a washer 43 and a nut 44. Roller 42 is received by a slot 45 in a floating or differential lever 46, so called because its position is controlled jointly by the pilot through shaft 35 and lever 38 and by an hydraulic servo-motor. Lever 46 carries a pin 47 connected by link 48 with pin 49 on lever 50 attached to shaft 51 journalled as shown in Fig. 7 in bearings provided by the housing 1 and cover 3. Shaft 51, which operates the throttle valve 60, is connected therewith by arm 52 (Figs. 1, 4 and 7), adjustable link parts 54, 55 and 56, screw 57, arm 58 and shaft 59 on which valve 60 is mounted.

The lower end of lever 46 (Fig. 7) is bifurcated (Fig. 7) to embrace a rod 62 and to receive a pin 61 passing through it. Rod 62 slides in a bushing 63 mounted in a boss 64 integral with housing 1 and in bushing 65 mounted in a wall of the housing. Rod 62 is attached to a piston 66 slidable in a cylinder 67 provided by housing 1. A spring 68 urges the piston 66 right and returns it to normal position shown in Fig. 6 in case of failure of oil pressure.

Figure 8:
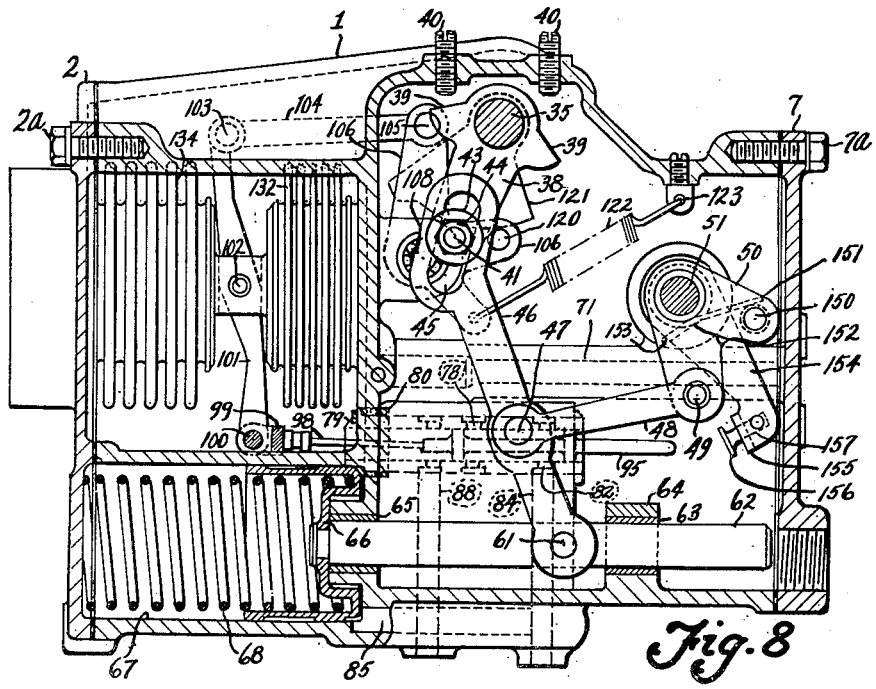
Figure 24:
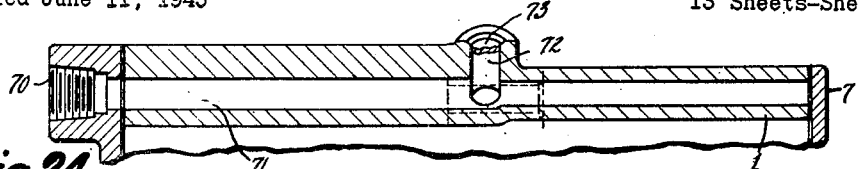

The oil high pressure line is connected at 70 (Figs. 4 and 24), and passes through passage 71 closed by cover 7 (Fig. 24) and through side passage 72 (plugged at 73) and through passage 74 (Fig. 25, plugged at 74a) and through passage 75 which crosses passage 76 (plugged at 76a). Passage 75 leads to a groove 77 in valve guide 79; and groove 77 is connected by a plurality of ports 78 with the interior of the guide 79. Guide 79 is received as shown in Fig. 10 in a bore provided by housing 1, and is retained by a flange 79a on its right end and by a split-ring washer 80 against which there bears a spring 81. Guide 79 has distributing ports 82 leading into a groove 83 connected by passage 84 (plugged at 84a) and passage 85 (Figs. 26 and 8) with the right end of cylinder 67. Guide 79 has distributing ports 86 leading into a groove 87 connected by passage 88 (plugged at 89) and by passages 90 and 91 (Figs. 25 and 26) with the left end of cylinder 67.

The distributing ports 82 and 86 (Fig. 10) are controlled by lands 96 and 97, respectively, of a valve 95 connected by rod 98, clevis 99 and pin 100 with a floating lever 101, pivoted at 102 on a bridge 130 and carrying a pin 103 connected by link 104 and pin 105 with lever 106. Lever 106 (Fig. 12) is attached to a hub 107 journalled on rod 108 having aligned cylindrical pintles 109 which are eccentric to the axis of rod 108. Pintles 109 are journalled in ball bearings 110, supported by bosses 111 provided by housing 1. Hub 107 has a slot 112 through which there extends a rod 113, threaded into rod 108 and having an eye 114. Rod 113 provides a lever for rotating the rod 108 for a purpose to be described. Lever 106 carries a pivoted roller 120 for engaging a pressure selecting cam 121 which is manually rotated by the pilot through the shaft 35. The roller 120 is urged toward the cam 121 by a spring 122 connecting lever 106 with a screw-eye 123.

The valve 95 to which lever 101 is connected is under joint control by the cam 121 and by a device responsive to engine intake pressure. Fig. 5 shows that the bridge 130, which supports pin 102, connects the adjacent end plates 131 and 133 of bellows 132 and 134 having remote end plates 135 and 136. Plate 135 is attached to housing 1; and plate 136 has a central boss 137 received by a tubular boss 138 in cover 2. Boss 137 is urged against an adjustable plug 139 by the springs which tend to expand the bellows. By turning the plug 139 the correct initial location of pin 102 can be established. Bellows 134 is evacuated. Bellows 132 is connected by passages 140, 141 and 142 with a pipe (not shown) which is threadedly connected at 143 and with the engine intake at the manifold or at the outlet of the housing of the engine stage supercharger. The compression spring 144 in bellows 132 is confined between plate 131 and a ring 145 carried by annular plate 135. Compression springs 146 and 147 within bellows 134 are confined between plates 133 and 136. The external areas of the bellows are equal so that the location of pin 102 will be controlled only by engine intake pressure. The springs 144, 146 and 147 are so constructed and calibrated that pin 102 is positioned in a predetermined relation to intake pressure in bellows 132. Thus the throttle-valve-operating servo-motor is under joint control by the pressure selecting cam 121 and by engine intake pressure.

Fig. 34 is based on 66° of rotation of lever 38. The right border of Fig. 34 indicates degrees of opening of throttle 60 from idle position. Curve P—Q represents the throttle movement which can be effected by moving the lever 38 which is manually operated by the pilot when selecting the pressure to be maintained. The left border of Fig. 34 indicates manifold pressure. Curve G—H shows the manifold pressures which can be obtained by movement of the throttle 60 through manual movement of lever 38 (Fig. 6) while the piston 67 remains at the right end of cylinder 67. The manual movement of the throttle and pressure resulting from the manual movement of the throttle are such that a take-off could be made and a safe landing could be effected although the throttle-valve servo-motor failed to operate. Curve J—K—L—M shows the pressures selected by cam 121 for various positions of lever 38. The portion to the left of the "minimum cruise" line is not effective during flight. Selected pressure J, at the "engine-idle" position of lever 38 is negative 17" Hg abs. which is effective, in case of a punctured aneroid bellows 134, to give a net positive pressure of 29.6" less 17" equals 12.6" only a little above the 10", point G on line G—H. Therefore the engine can be controlled for safe-landing by the pilot's control lever acting through the shaft 35 and lever 38 on the throttle valve 60, while the throttle-valve servo-motor remains non-operative.

In order that the pressures selected for minimum cruise or greater may be maintained, the servo-motor piston 66 is caused to move toward the left to effect whatever additional opening of the throttle 60 is required to correct for any divergencies between intake pressure transmitted to bellows 132 and the selected pressure. For example, assume that the pilot wishes to "take off." Lever 38 is moved from the position shown in Fig. 6 to that shown in Fig. 8 which is its 55° position. A pressure of 44.5" Hg abs. has been selected. The valve 95 has been moved right in Fig. 8 to connect ports 78 and 82 and piston 66 starts moving left toward the position in Fig. 9 to increase the throttle opening by whatever amount is required to bring the intake pressure up to the selected pressure. When these pressures balance the valve 95 returns to the equilibrium position shown in Fig. 9 and movement of the piston 66 toward the left ceases. As the altitude pressure decreases, the piston 66 continues moving left to increase the throttle opening. Finally the throttle becomes wide open as indicated by a point on line E—F (Fig. 34) indicating substantially wide-open throttle. The altitude at which the throttle must be wide-open to maintain the selected pressure is called the critical altitude for the pressure selected. At higher altitudes the pressure diminishes unless there be an auxiliary supercharger whose speed can be increased to create more pressure.

Figure 9:
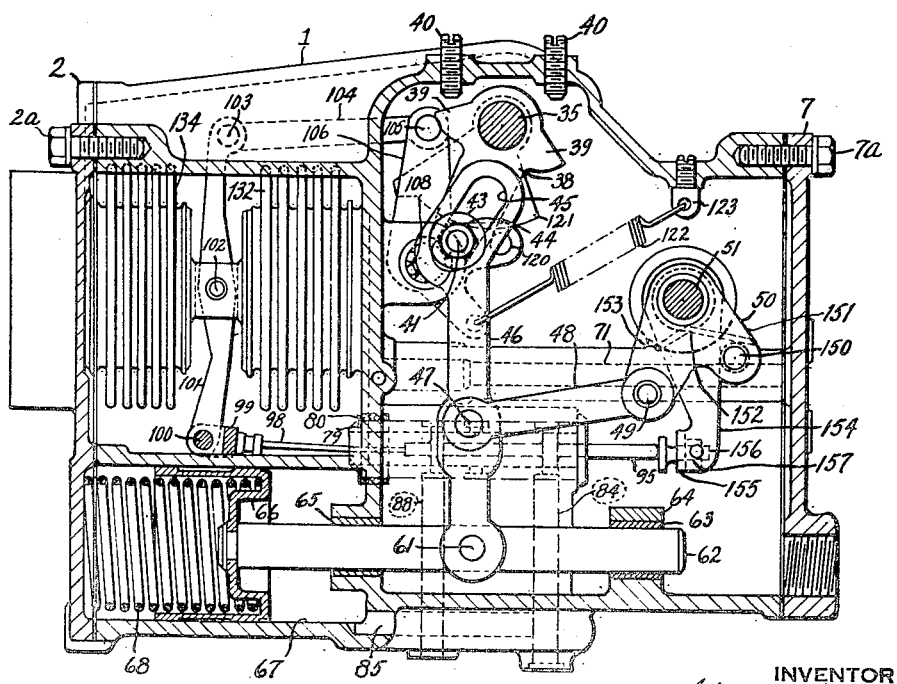

Fig. 9 shows the status when wide open throttle has been obtained for a pressure selection of 44.5" Hg. Bellows 132 has expanded and bellows 134 has contracted as the result of the pressure in bellows 132. Valve 95 is in balanced position. Critical altitude for a pressure selection of 44.5" Hg has been reached. The plane ascends still higher and altitude pressure drops. The engine pressure falls and pin 102 is urged toward the right in Fig. 9 and tries to move valve 95 right to cause the piston 66 to move left of the position shown in Fig. 9, in the effort to obtain greater throttle opening. But that would avail nothing because the throttle is already wide open.

To prevent such movement of the piston 66 to the left of the position shown in Fig. 9, an hydraulic check or lock has been provided. The movement of lever 50 to bring the throttle 60 to wide open position causes a pin 150 to bear against a lever 154 having an ear 155 carrying a screw 156 which is caused to engage the valve 95 and to hold it in equilibrium position. Therefore when the throttle 60 is wide open, no oil can pass into or out of the cylinder 67 and the piston 66 is hydraulically locked in that position at which it arrived when the throttle 60 was brought into wide-open position. Lever 154 is loosely supported by the shaft 51; and it is urged toward the pin 150 by a spring 152 having an end 151 bearing against the pin 150 and an end 153 bearing against the lever 154. As shown in Figs. 6 and 10, the spring 152 urges the lever 154 toward plate 7, while pin 150 may move away from lever 154.

The reason for providing a servo-motor with piston travel greater than required for wide-open throttle a 44.5" Hg pressure selection will be apparent from Fig. 34, which shows that the required servo-motor movement of the throttle is, for various pressure selections, the distance vertically between line DEF and line P—Q. These distances increase as the selected pressures decrease from "take-off" or 44.5" Hg. Therefore the available servo-motor movement of the throttle must be greater for lower pressure selections. The geometry of the throttle operating mechanism is such that when the servo-piston moves full-stroke left, the throttle will be full-opened at a pressure selection of about 30" Hg which is slightly above minimum cruise pressures. Between the 0° and 25° positions of lever 38 the maximum possible throttle opening decreases slightly as indicated by the line D—E. It is apparent that the throttle can be brought to wide-open position for any pressure selection used during flight.

Experience in the use of the apparatus reveals that the throttle travel is actually about two degrees greater than that calculated before motion is arrested by the hydraulic lock. Therefore, if the required throttle movement is 72° the mechanism is calculated to give 70° throttle movement as indicated by E—F on the 70° line in Fig. 34.

Figure 25:
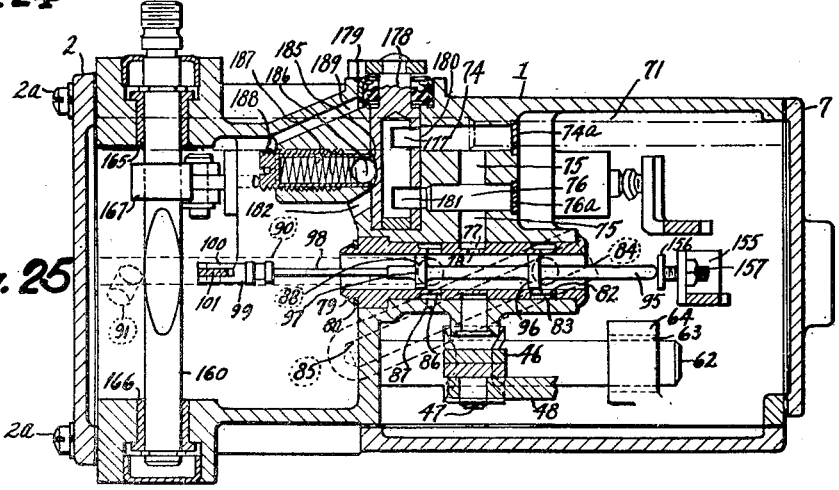
Figure 26:
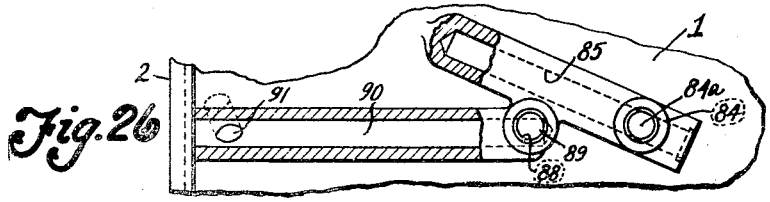
Figure 27:
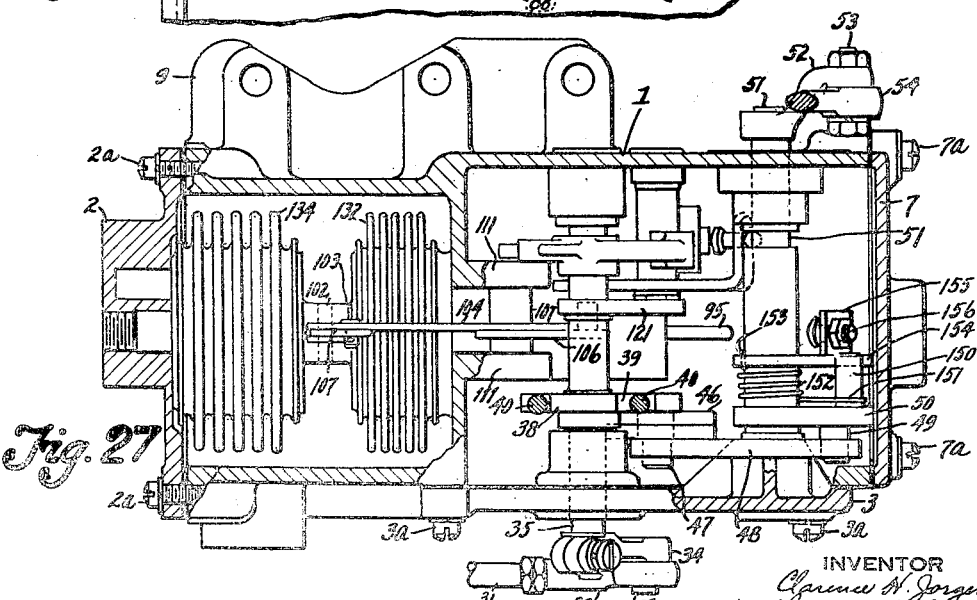

Fig. 2 shows a shaft 160 attached to a lever 161 having a slot 163 for receiving a bolt 162 which may be secured in the required position along the slot by tightening a nut 162a. Bolt 162 provides for making a connection with a linkage (not shown) connected with the control lever of a propeller pitch governor. Lever 161 is movable from the full line position to the position 161a to change the governed speed of the engine from minimum to maximum. Shaft 160 (Figs. 15 and 22) is mounted in bearings 162 and 166 and carries a lever 167 secured by tightening a hub-clamping screw 168. A pin 169 connects the lever 167 with a link 170, having a hub 170a (Fig. 21) connected by pin 171 with a tubular piston rod 172 attached to a piston 173 slidable in a cylinder 174 provided by housing 1. Piston rod 172 is slidable in bushings 174a and 174c, bushing 174a being secured in the cylinder 174 by a nut 174b. Piston 173 has a circumferential groove 175 which receives oil under pressure from a passage 176 (Fig. 12) connectible with a port 177 (Fig. 25) in a valve 178 operated by a lever 179 and rotatable in a bore 180. Fig. 25 shows port 177 connected with passage 74. Valve 178 has another port 181 connectible either with passage 76 or with a drain passage 182. Passages 74 and 76 are connected with oil pressure passage 71. When the valve 178 is in the position shown in Fig. 15, the piston groove 175 receives pressure oil. A limited rotary movement of valve 178 may take place while pressure oil still flows to groove 175. This movement in a counterclockwise direction in Fig. 15, or clockwise in Fig. 2, may take place until arrested by a stop provided by a shoulder 179a of an annular boss 179c (provided by housing 1) which is engaged by a lug 179d (Fig. 2). Counterclockwise movement of lever 179 (Fig. 2) is arrested by the engagement of the lug 179d with another shoulder 179b of the annular boss 179c. This counterclockwise movement in Fig. 2 will be clockwise in Fig. 15 and results in disconnecting passages 74 and 76 from valve 178 and causing passage 176 (Fig. 23) to be connected with drain passage 182 through the bore in valve 178. This renders inoperative the servo-motor for actuating the lever 160 and permits manually controlling the propeller pitch governor. Spring 230 (Fig. 15) will return the piston 173 to its extreme left position and lever 161 (Fig. 2) will be moved to position 161a which will condition the propeller governor for highest speed required for magneto check. The valve 178 may be yieldingly retained in one or more of its positions by providing a detent groove or grooves 185 for receiving a ball 186 urged toward the groove by a spring 187 retained by a plug 188. By plugging hole 75, valve 178 can be used to disconnect the throttle-valve operating servo-motor from pressure oil passage 71 and to connect said motor with drain. This should be done in order to prevent scape of oil in case of damage to the servo-motor.

Fig. 15 shows that passages 190 connect groove 175 with diametrically opposite grooves 191 in rod 172 and that holes 192 connect these grooves with the space between lands 193 and 194 of a valve 195 slidable with the rod 172. Figs. 17 and 19 show that land 194 controls ports 224 leading to diametrically opposite grooves 226 (displaced 60° from grooves 191); and that grooves 226 are connected by holes 228 with the left side of piston 173. Figs. 18 and 20 show that land 193 controls ports 223 leading to diametrically opposite grooves 225 (displaced 60° from grooves 191 and 226) and that grooves 225 are connected by holes 227 with the right side of piston 173. It is apparent that the piston 173 will follow the valve 195 and will stop with its ports 223 and 224 blocked by the valve lands. If valve 195 moves left to uncover ports 223 and 224, pressure oil enters the right end of cylinder 174 through ports 223, grooves 225 and holes 227, while oil in the left end of the cylinder discharges through holes 228, grooves 226 and ports 224 and out the right end of rod 172. The piston 173 moves left the distance which valve 195 had moved left because that is the distance required to align ports 223 and 224 with valve lands 193 and 194. If valve 195 moves right from the position of equilibrium last mentioned, ports 223 and 224 are again uncovered by the lands 193 and 194 displaced to the right. Pressure oil enters the left end of cylinder 174 through ports 224, grooves 226 and holes 228 to cause piston 173 to move right while oil is being discharged from the right end of cylinder 174 through holes 227, grooves 225 and ports 223 and out through the left end of rod 172. The right movement of the piston 173 is equal to the displacement of valve lands 193 and 194 to the right of ports 223 and 224.

The valve 195 is positioned by a screw 196 against which valve 195 is urged by a spring 197 confined by a cup 198 bearing against link 170. Screw 196 is carried by an ear 199 of a lever 200 and is secured in adjusted position by a nut 196a. Lever 200 has a hub 201 (Fig. 16) journalled on a stud 202 carried by housing 1 and retained by washer 203 and a nut 204 secured by a pin 205. Lever 200 carries a stud 208 supporting a roller 209 for engaging the cam surface 210a of a cam plate 210 pivoted at 211 on an arm 212 having a hub 213 fixed to the main control shaft 35. Plate 210 is pulled against a strut 216, extending from hub 213, by a spring 215 connecting plate 210 with an eye 214 extending from hub 213. When the shaft 35 is rotated clockwise to select the pressure denoted by J—K—L—M (Fig. 34) the cam 210a so controls valve 195, piston 193, lever 167, shaft 160 and lever 161 as to cause the engine governed speed to vary according to the schedu'e denoted by A—B—C (Fig. 34) which is the schedule for a fully loaded plane.

For cruising with less than full load, the speed schedule may be reduced as indicated by lines $A_1$—B, $A_2$—B, $A_3$—B, $A_4$—B, $A_5$—B or any schedule between. The full load schedule can be reduced by moving clockwise (Fig. 2) a lever 243 attached to a shaft 242 and connected by link 245 and pin 246 with lever 179 which controls valve 178, which continues to connect the oil pressure duct 71 with the piston groove 175 during this movement. In Fig. 15, shaft 242 is rotated counterclockwise to move a pin 240 carried by arm 241 into engagement with a cam surface 210b of plate 210 which moves down to cause lever 200 to move right a distance depending on the extent of downward movement of pin 240. Valve 195 can follow the screw 196 under the action of spring 197 at least until stopped by the engagement of a notched collar 231 provided by the valve with a split-ring 232 seated in a groove adjacent the right end of piston rod 172. Therefore the piston 173 will not begin to move left to rotate lever 167 from its position of lowest speed control until the control lever 138 has moved further than from about its 11° position. The greater the distance plate 210 is moved downwardly from its normal location the greater will be the distance that the lever 138 must be moved before piston 173 starts to move left, as indicated by points $A_1$, $A_2$, $A_3$, $A_4$, $A_5$ (Fig. 34). The portions of cam surface 210a near to the pivot 211 are affected but slightly, hence the schedules begun at $A_1$ to $A_5$ return to the normal schedule at B when the lever 33 moves to its 40° position. The normal schedule is resumed for pressure selections above 38.6″ Hg, for example.

When lever 243 is moved counterclockwise (Fig. 2) until lug 179d engages stop shoulder 179b, valve 178 rotates to close passages 94 and 76 and to cause passage 176 (Fig. 23) to be connected with passage 182. This removes the hydraulic pressure tending to move the piston 173. Spring 230 returns the piston 173 to a position calling for highest governed engine or propeller speed required for checking the ignition magneto. The pilot can actuate the propeller pitch governor control and piston 173 follows along, the oil in the left end of cylinder 174 being discharged as piston 173 moves left relative to valve 195. The discharge is through holes 228 (Fig. 17), grooves 226, ports 224, holes 192, hole 190, groove 175, passage 176, valve port 181 and outlet 182 into the housing 1. Spring 230 assists piston movement toward the left. As piston 193 is moved right during manual operation of the propeller pitch governor control, oil in the right end of cylinder 174 can escape through holes 227, grooves 225 (Fig. 18) and ports 223 and out the left end of piston rod 172.

The gear-shift operating unit will now be described with reference to Figs. 28A—B, 29 through 33. This unit provides, exterior of housing 4, a lever 250 (Fig. 31) to be connected in any suitable manner with the gear-shift operating member of the transmission gearing which connects the engine with an auxiliary supercharger. Lever 250 is attached to a shaft 251 journalled in ball bearings 252 carried by cover 5 and retained by a plate 254 attached to cover 5 by screws 255 and providing an oil seal 253. Shaft 251 is operated by a lever 256 carrying a stud 257 having a part 258 which is movable between motion limiting screws 259 and 275, the latter being locked by a nut 276.

A spring 260 connects stud 257 with a stud 261 on lever 262 attached to shaft 263 journalled in bearings 265 and retained by snap-ring 264. Stud 261 receives a spacer 266 and a link 267 connected as shown in Fig. 28A with a pin 268 carried by a clevis 269 attached to a piston 270 slidable in a cylinder 271 provided by housing 4. A spring 272 which urges piston 270 toward the right is retained by a washer 273 and a snap-ring 274. The normal position of the arm 256 is shown in Fig. 28A, wherein its stud part 258 is urged against screw 275 by the spring 260.

Pressure oil for operating the piston 270 comes through passage 280 (Fig. 32) which becomes connected with the pressure oil passage 71 of housing 1 when housing 4 is attached thereto in place of cover 7. Passage 280 leads to duct 281 and thence to a groove 283 in a valve guide 282 urged against a seat 282s by a spring 282a. Groove 283 leads to ports 284 and thence to the space between the lands 291 and 292 of a valve 290. Valve land 292 controls ports 285 leading to groove 286 connected by ducts 287 and 288 with cylinder 271. Valve 290 is connected by rod 293, clevis 294, stud 295 with a lever 296. Lever 296 is pivoted at 297 and is provided with a slot 298 and with a pad 299 (Fig. 30) against which there bears a spring 305 retained by a stud 306 to cause the pad 299 to engage a cam 300 provided by a shaft 301 journalled in bearings 302 and 303 (Fig. 31) and restrained against axial movement toward the left by a washer 301a and a pin 301b.

Shaft 301 is operated by arm 38 (Fig. 28A) by providing it with a stud 313 for receiving a link 312 connected by studs 311 with a cam plate 310 attached to shaft 301. Cam plate 310 has a cam slot 315 for receiving a roller 316 journalled on a stud 317 carried by lever 318 having a hub 319 (Fig. 31) journalled on stud 257. Arm 318 has a lug 320 engageable with a lug 321 of an arm 330 connected by stud 331 (Fig. 31) and a link 332 with the rod 113 which, as shown in Fig. 13, adjusts the shaft 108 having the eccentric trunnions 109. A yoke 322 connects arm 330 with an arm 323, both arms being loosely journalled on shaft 301. Arm 323 has a lug 324 urged against a stop 325 (Fig. 33) by a spring 323a connecting the arm 323 with a stud 323b. Spring 323a urges arm 323 counterclockwise in Fig. 33 which means that lug 321 of arm 330 will resist (through the force of spring 323a) clockwise movement due to engagement of lug 320 therewith. Therefore spring 323a tends to hold rod 113 and shaft 108 (Fig. 12) in a normal position wherein lever 106 (Fig. 10) is located in a normal position relative to cam 121 which selects pressures according to a normal schedule.

The valve 282 which controls the admission of pressure oil to the cylinder 271 is under joint control by the cam 300 coordinated with the pressure selecting cam 121 and by an aneroid. The aneroid control comprises an aneroid bellows 352 having end plates 353 and 354. A rod 340 extends from plate 353 through a hole 350 in a wall 351 of housing 4 and carries the pivot pin 297. Rod 340 is maintained in a substantially vertical position during its up and down movement by providing it with a pin 341 connected with a lever 342 having a hub 343 (Fig. 32) which, together with a spacer 344, is mounted on a pivot screw 345 retained by a lock nut 346. A spring 347 surrounds rod 346 and bears against lever 296 and urges upwardly a washer 348 against a finished surface 349 of wall 351 to provide a seal for the hole 350 so that variations in pressure in housing 4, due to discharge of oil from the cylinder 271 and other cylinders of housing 1 to which housing 4 is attached, will not materially disturb the pressure acting on aneroid 352 which is housed in a chamber between wall 351 and the cover 6. The upper plate 354 has a threaded stem 355 passing loosely through a hole in cover 6 and receives a nut 356 urged downwardly by a spring 357 against a finished surface of cover 6. By turning nut 355, the aneroid can be adjusted vertically so that valve 290 can be properly located in initial position. As nut 356 is turned, rotation of plate 354 is prevented by a pin 358 attached to the plate and slidable in a hole in the cover 6. The nut 356 is protected by a cover 359 attached by a screw 360 to the stem 355. A spring 361 resists the collapsing of bellows 352, the movement of plate 353 toward plate 354 being limited by a spacer sleeve 362.

The control mechanism can be disabled by the upward movement of a pin 370 received by slot 298 in lever 296. Such movement will cause lever 296 to move upward from any position of automatic control to cause valve 290 to return to the position shown in Fig. 28A so that cylinder 271 will be connected with discharge ports 285 and the spring 272 can return the piston to normal position as shown in Fig. 28A. Pin 370 is attached to arm 371 attached to shaft 372 which, as shown in Fig. 2, is operated by a lever 373.

Fig. 35, based on altitude and horsepower, shows power lines corresponding to the predetermined schedule of engine speeds and selected pressures. The present gear-shift operating unit is intended to effect shift from low to high gear according to shift line $x$—$y$. For pressure selections at 37.5″ Hg and higher, shift takes place at a minimum altitude line, for example, 10,500 feet. The shift takes place at higher altitudes as the pressure selection is decreased from 37.5″ Hg. The upper right of Fig. 35 gives a schedule of pressure selections and corresponding pressure increases at time of shift. The increases range from zero for 29.2″ pressure selection and lower to 5.7″ for 38.6″ pressure selection and back to zero for 44.3″ selection or higher. No pressure increase is needed in the low pressure range. No pressure increase to a value over 44.3″ Hg is permitted on account of possible detonation due to raising the temperature of the intake air on account of high speed operation of the auxiliary blower. Hence there is no pressure increase when the pressure selection is 44.3″. By withholding the shift to high blower until at least a minimum altitude is reached, there is such drop in pressure from a pressure selection in excess of 44.3″ that the maximum pressure after shift to high blower will not exceed 44.3″.

Fig. 28A shows the apparatus in normal or non-operating condition. Cylinder 271 is vented. Fig. 28B shows the location of cam 308 and cam plate 310 for the pressure selection of 38.6″ Hg which can be given the greatest increase at time of shift into high blower. The roller 316 of lever 318 engages the hump 315a of cam surfaces 315 of cam plate 310. Valve 290 is about ready to open ports 285. When that altitude is reached which coincides with that point of the shift line $x$—$y$ (Fig. 35) common to pressure line 38.6″ Hg, the ports 290 will be "cracked open" and piston 270 will move left causing lever 262 to move into the position shown in Fig. 28B and likewise lever 256 due to the snap-action of spring 260. As shift into high takes place by the movement of lever 256, lever 318 moves into the position shown in Fig. 28B thereby causing, through the engagement of its lug 320 with lug 321 of lever 330, such rotary movement of shaft 108 (Figs. 10 and 13) in a counterclockwise direction about the axes of trunnions 109 as to cause a movement of lever 106 in a counterclockwise direction while its roller 120 rests on cam 121. Lever 106 receives the same movement as it would have received by rotating the cam 121 into a higher pressure selecting position. Therefore the intake pressure is increased although the pressure selecting cam 121 has not been moved.

The variable increase of pressure at time of shift into high blower is determined by the contour of cam 315 which can be shaped to suit any required schedule of increases.

After the shift into high blower has been made, the plane can climb substantially before the critical altitude for high blower is reached.

During descent, when the altitude becomes slightly less than that scheduled by the shift line $x$—$y$, the land 292 of valve 290 is raised above the ports 285 and the cylinder 271 becomes vented and the spring 272 is released for operation to cause the mechanism to return to the status shown in Fig. 28A and the auxiliary blower to return to low-speed operation.

In the modification shown in Fig. 36, datum cam lever 106′ carries a stud engageable with a stop 401 in the form of a disc integral with a screw 402 and eccentric with respect to the axis thereof. Screw 402 is threaded through a plate 403 attached by screws 404 (Fig. 38) to housing 1. A washer 405 is connected with screw 402 by providing it with a flat 402a receiving a flat provided by the hole in the washer. Washer 405 has an index 407 pointing to graduations on a plate 408 attached to housing 1. The graduation mark indicated by the index 407 shows the maximum pressure which can be obtained. For example, it is necessary to limit the maximum pressure to 71.5″ Hg, so that the engine will not detonate, the screw 402 is turned until the index 407 points to the 71.5″ mark on the dial and a nut 406 threaded on screw 402 is tightened to secure it in the required position. The eccentric stop 401 is so located that roller 120 cannot follow the datum cam 121 beyond its 71.5″ Hg pressure selecting position. In this way, the regulator can be adjusted to meet the requirements of various engines.

A lost-motion connection between lever 101′ and lever 101 is provided. Pin 105′ attached to lever 106′ connects with a link 410 having a slot 411 receiving a pin 103′ attached to lever 101. The normal distance between pins 105′ and 103′ is maintained by a spring 412 connecting these pins and received by a recess 413 in link 410. The yielding connection provided by the spring 412 is needed in a construction which, for sake of shortening the regulator, requires locating the shaft 161 so much closer to the clevis 99 than shown in Fig. 10. It is possible to have a condition when, at the time when cam 121 is moving counterclockwise to move lever 106′ clockwise, clevis 99 is engaging shaft 160. A non-yielding link between lever 106′ and lever 101 would distort lever 101. The spring 412 provides, in effect, a stretchable link whereby the distance between pins 105′ and 103′ can increase while clevis 99 is engaging shaft 160.

Instead of the rotary valve 178 for controlling the propeller pitch governor servo-motor, Fig. 38 shows a slide valve 420 having lands 421 and 422 for controlling, respectively, pressure-oil inlet port 423 and drain port 424. Valve 420 is connected by a rod 425 with the movable core or armature 426 of a solenoid 430 having a fixed core 427, a magnet coil 428 and a spring 429 urging the armature toward the right. Normally inlet 423 is open, and drain 424 is closed. By closing a manually operated switch (not shown) the magnet coil 428 is connected with a current source; and armature 426 and valve 420 move left in order to block inlet 423 and to open drain 424. Pressure to the left of piston 173 is relieved; and spring 238 pushes the piston 173 to extreme left thereby causing the lever 161 to be positioned for highest governed engine speed. In the form shown in Fig. 37, the control of the propeller governor control servo-valve by lever 243 (Fig. 2) is omitted.

The modification of normal speed schedule A—B—C (Fig. 34) to give a schedule such as represented by A₁—B—C, A₂—B—C, etc., (Fig. 34) can be effected by the lever 243 for purposes other than for reducing governed speed and power output as the load carried by the plane decreases. For example, in case of multiple engines each equipped with the resent regulator, the levers 243 may be individually operated in order to equalize the engine speeds.

While the embodiments of the present invention as herein disclosed, constitute preferred forms, it is to be understood that other forms might be adopted, all coming within the scope of the claims which follow.

What is claimed is as follows:

1. A pressure regulator for a supercharged internal combustion engine having a throttle valve comprising, in combination, manually operable means for moving the throttle valve and for selecting an engine intake pressure to be maintained, an engine-intake-pressure-sensitive element, a servo-motor capable of adding to the manually-effected movement of the throttle valve a movement required to bring the throttle valve into substantially wide-open position at critical altitude when the manually operable means is in a certain low-pressure-selecting-position and a movement which is greater than necessary when the manually operable means is in positions selecting higher pressures, means for controlling the servo-motor under joint control by the manually operable means and by said element whereby the throttle valve is moved by the servo-motor to compensate for deviations of intake pressure from selected pressure, and means for conditioning the servo-motor control means to arrest that movement of the servo-motor which would move the throttle valve past wide-open position when said throttle valve has been moved into substantially wide-open position.

2. A pressure regulator for a supercharged internal combustion engine having a throttle valve comprising, in combination, manually operable means for moving the throttle valve and for selecting an engine intake pressure to be maintained, an engine-intake-pressure-sensitive element, an hydraulic servo-motor capable of adding to the manually-effected movement of the throttle valve a movement required to bring the throttle valve into substantially wide-open position at critical altitude when the manually operable means is in a certain low-pressure-selecting position and a movement which is greater than necessary when the manually operable means is in positions selecting higher pressures, a valve for controlling the servo-motor under joint control by the manually operable means and by said element whereby the throttle valve is moved by the servo-motor to compensate for deviations of intake pressure from selected pressure, and means responsive to movement of the throttle valve into substantially wide-open position for moving the servo-motor-control-valve into equilibrium position thereby arresting that movement of the servo-motor which would move the throttle valve past wide-open position.

3. A pressure regulator for a supercharged internal combustion engine having a throttle valve comprising, in combination, manually operable means for moving the throttle valve and for selecting an engine intake pressure to be maintained, an engine-intake-pressure-sensitive element, an hydraulic servo-motor capable of adding to the manually-effected movement of the throttle valve a movement required to bring the throttle valve into substantially wide-open position at critical altitude when the manually operable means is in a certain low-pressure-selecting-position and a movement which is greater than necessary when the manually operable means is in positions selecting higher pressures, a valve for controlling the servo-motor under joint control by the manually operable means and by said element whereby the throttle valve is moved by the servo-motor to compensate for deviations of intake pressure from selected pressure, and means responsive to movement of the throttle valve into substantially wide-open position for hydraulically locking the servo-motor.

4. A pressure regulator for a supercharged internal combustion engine having a throttle valve and propeller pitch governor comprising, in combination, a manually operated control member, devices operated thereby for selecting engine intake pressures and engine speeds according to a predetermined schedule, manually operable means for variably modifying the speed schedule effected by the speed selecting device while the pressure schedule remains unchanged, an engine-intake-pressure-responsive element, means under control by said pressure selecting device and said element for positioning the throttle valve to maintain a selected pressure, and means under control by the speed setting device for adjusting the setting of the control means for the propeller pitch governor so as to variably control the engine speed in accordance with the position of said speed setting device.

5. A pressure regulator for a supercharged internal combustion engine having a throttle valve and propeller pitch governor comprising, in combination, a manually operated control member, a pressure selecting cam and a speed selecting cam operated by the member for selecting engine intake pressures and engine speeds to be maintained according to predetermined schedules, means supporting the speed selecting cam for movement by the control member and for movement laterally of the direction of its movement by the control member, manually operable means for variably effecting lateral movement of the speed selecting cam in order to modify the speed schedule, while the pressure schedule remains unchanged, an engine-intake-pressure-responsive element, means under control of said pressure selecting cam and said element for positioning the throttle valve to maintain a selected pressure, and means under control by the speed setting cam for adjusting the setting of the control means for the propeller pitch governor so as to variably control the engine speed in accordance with the position of said speed setting device.

6. A pressure regulator for a supercharged internal combustion engine having a throttle valve and propeller pitch governor comprising, in combination, a manually operated control member, devices operated thereby for selecting engine intake pressures and engine speeds to be maintained according to a predetermined schedule, an engine-intake-pressure-responsive element, means under control by said pressure selecting device and said element for positioning the throttle valve to maintain a selected pressure, means under control by the speed setting device for adjusting the setting of the control means for the propeller pitch governor, so as to variably control the engine speed in accordance with the position of said speed setting device, automatic means for effecting increase of speed of a blower connected with the engine intake in response to the attainment of altitudes varying with pressure selection, means responsive to the functioning of said automatic means for modifying the pressure schedule as determined by said control member and means for modifying the speed schedule as determined by said control member while the position of said control member is unchanged.

7. A pressure regulator for a supercharged internal combustion engine having a throttle valve and propeller pitch governor comprising, in combination, a manually operated control member, devices operated thereby for selecting engine intake pressures and engine speeds to be maintained according to a predetermined schedule, an engine-intake-pressure-responsive element, means under control by said pressure selecting device and said element for positioning the throttle valve to maintain a selected pressure, means under control by the speed setting device for adjusting the setting of the control means for the propeller pitch governor, so as to variably control the engine speed in accordance with the position of said speed setting device, automatic means for effecting increase of speed of a blower connected with the engine intake in response to the attainment of altitudes varying with pressure selection, means responsive to the functioning of said automatic means for variably modifying the pressure schedule as determined by said control member to a degree of modification determined by a predetermined schedule of initially selected pressure values and pressure modification values and manually operable means for variably modifying the speed schedule as determined by said control member while the position of said control member is unchanged.

8. A pressure regulator for a supercharged internal combustion engine having a throttle valve, comprising, in combination, a manually operable main control member, means operated thereby for selecting an engine intake pressure to be maintained, an engine-intake-pressure-responsive element, automatic means under control by the pressure selecting means and by said element for moving the throttle valve when engine intake pressure deviates from the selected pressure, a servo-motor for controlling the speed of a blower connected with the engine intake, and means for effecting operation of the servo-motor to increase blower speed in response to the attainment of various altitudes depending on certain pressure selections, said means including a device positioned by the main control member for determining the altitudes to be attained in accordance with a predetermined schedule of pressure selections and altitudes.

9. A pressure regulator for a supercharged internal combustion engine having a throttle valve comprising, in combination, a manually operable main control member, means operated thereby for selecting an engine intake pressure to be maintained, an engine-intake-pressure-responsive element, automatic means under control by the pressure selecting means and by said element for moving the throttle valve when engine intake pressure deviates from the selected pressure, a servo-motor for controlling the speed of a blower connected with the engine intake, means for effecting operation of the servo-motor to increase blower speed in response to the attainment of various altitudes depending on certain pressure selections, said means including a device positioned by the main control member for determining the altitudes to be attained in accordance with a predetermined schedule of pressure selections and altitudes, and means responsive to the operation of the servo-motor to increase blower speed for increasing the selected pressure when the pressure selections are within a limited range.

10. A pressure regulator for a supercharged internal combustion engine having a throttle valve comprising, in combination, a manually operable main control member, means operated thereby for selecting an engine intake pressure to be maintained, an engine-intake-pressure-responsive element, automatic means under control by the pressure selecting means and by said element for moving the throttle valve when engine intake pressure deviates from the selected pressure, a servo-motor for controlling the speed of a blower connected with the engine intake, means for effecting operation of the servo-motor to increase blower speed in response to the attainment of various altitudes depending on certain pressure selections, said means including a device positioned by the main control member for determining the altitudes to be attained in accordance with a predetermined schedule of pressure selections and altitudes, and means responsive to the operation of the servo-motor to increase blower speed for modifying the selected pressures as determined by the main control member and including a device actuated by the main control member for variably conditioning the pressure modifying means to provide for pressure modification in accordance with a predetermined schedule of pressure selections and amounts of pressure modification.

11. A pressure regulator for a supercharged internal combustion engine having a throttle valve comprising, in combination, a manually operable main control member, means operated thereby for selecting an engine intake pressure to be maintained, an engine-intake-pressure-responsive element, automatic means under control by the pressure selecting means and by said element for moving the throttle valve when engine intake pressure deviates from the selected pressure, a servo-motor for controlling the speed of a blower connected with the engine intake, means for effecting operation of the servo-motor to increase blower speed in response to the attainment of various altitudes depending on certain pressure selections, said means including a device positioned by the main control member for determining the altitudes to be attained in accordance with a predetermined schedule of pressure selections and altitudes, a device for modifying the pressure selection as determined by the main control member, members respectively connected with the servo-motor and with the modifying device for transmitting motion from the former to the latter and means operated by the main control member for varying the amount of lost motion between said members whereby the extent of operation of the modifying device is coordinated with pressure selection according to a predetermined schedule.

12. A pressure regulator for a supercharged internal combustion engine having a throttle valve comprising, in combination, a manually operable main control member, means operated thereby for selecting an engine intake pressure to be maintained, an engine-intake-pressure-responsive element, automatic means under control by the pressure selecting means and by said element for moving the throttle valve when engine intake pressure deviates from the selected pressure, a servo-motor for controlling the speed of a blower connected with the engine intake, and means for effecting operation of the servo-motor to increase blower speed in response to the attainment of at least a certain minimum altitude regardless of pressure selection in a relatively high range and in response to the attainment of altitudes higher than the minimum when the pressure selections are within a certain lower range.

13. A pressure regulator for a supercharged internal combustion engine having a throttle valve comprising, in combination, a manually operable main control member, means operated thereby for selecting an engine intake pressure to be maintained, an engine-intake-pressure-responsive element, automatic means under control by the pressure selecting means and by said element for moving the throttle valve when engine intake pressure deviates from the selected pressure, a servo-motor for controlling the speed of a blower connected with the engine intake, means for effecting operation of the servo-motor to increase blower speed in response to the attainment of at least a certain minimum altitude regardless of pressure selection in a relatively high range and in response to the attainment of altitudes higher than the minimum when the pressure selections are within a certain lower range, and means operated by the servo-motor when increasing blower speed for variably modifying the pressure selection effected by the main control member, said means including a device positioned by the main control member for determining the extent of modification of pressure selection in accordance with a predetermined schedule of pressure selections and pressure modifications.

14. A pressure regulator for a supercharged internal combustion engine having a throttle valve comprising, in combination, a manually operable main control member, means operated thereby for selecting an engine intake pressure to be maintained, an engine-intake-pressure-responsive element, automatic means under control by the pressure selecting means and by said element for moving the throttle valve when engine intake pressure deviates from the selected pressure, a servo-motor for controlling the speed of a blower connected with the engine intake, means for effecting operation of the servo-motor to increase blower speed in response to the attainment of various altitudes depending on certain pressure selections, said means including a device positioned by the main control member for determining the altitudes to be attained in accordance with a predetermined schedule of pressure selections and altitudes, and means operated by the servo-motor when increasing blower speed for boosting the selected pressures only to a certain maximum value when the selected pressures are within a certain relatively high range, and for boosting the selected pressures to values lower than the maximum when the selected pressures are within a lower range, said means including control element operated by the main control member in coordination with pressure selection.

15. A pressure regulator for a supercharged internal combustion engine having a throttle valve comprising, in combination, a manually operable main control member, means operated thereby for selecting an engine intake pressure to be maintained, an engine-intake-pressure-responsive element, automatic means under control by the pressure selecting means and by said element for moving the throttle valve when engine intake pressure deviates from selected pressure, a servo-motor for controlling the speed of a blower connected with the engine intake, means for effecting operation of the servo-motor to increase blower speed in response to the attainment of various altitudes depending on certain pressure selections, said means including a device positioned by the main control member for determining the altitudes to be attained in accordance with a predetermined schedule of pressure selections and altitudes, and means operated by the servo-motor when increasing blower speed for boosting the selected pressures only to a certain maximum value when the selected pressures are within a certain relatively high range, and for boosting the selected pressures to values lower than the maximum when the selected pressures are within a lower range, said means including control element operated by the main control member in coordination with pressure selection.

16. A pressure regulator for a supercharged internal combustion engine having a throttle valve comprising, in combination, manually operable means for moving the throttle valve and for selecting an engine intake pressure to be maintained, an engine-intake-pressure sensitive element, a servo-motor capable of adding to the manually-effected movement of the throttle valve a movement required to bring the throttle valve into substantially wide open position at critical altitude when the manually operable means is in a certain low-pressure-selecting-position and a movement which is greater than necessary when the manually operable means is in positions selecting higher pressures, means for controlling the servo-motor under joint control by the manually operable means and by said element whereby the throttle valve is moved by the servo-motor to compensate for deviations of intake pressure from selected pressure, a stop device operable to prevent further movement of the throttle by said servo-motor when said throttle reaches a predetermined open position, actuating means for moving said stop device into its effective position and means operated by the servo-motor for operating the actuating means for said stop device.

17. A pressure regulator for a supercharged internal combustion engine having a throttle valve comprising, in combination, manually operable means for moving the throttle valve and for selecting an engine intake pressure to be maintained, an engine-intake-pressure-sensitive element, a servo-motor capable of adding to the manually-effected movement of the throttle valve a movement required to bring the throttle valve into substantially wide-open position at critical altitude when the manually operable means is in a certain low-pressure-selecting-position and a movement which is greater than necessary when the manually operable means is in positions selecting higher pressures, means for controlling the servo-motor under joint control by the manually operable means and by said element whereby the throttle valve is moved by the servo-motor to compensate for deviations of intake pressure from selected pressure, a stop device operable to prevent movement of the throttle past wide open position by the servo motor, actuating means for moving said stop device into its effective position and means operated by the servo motor for operating the actuating means for said stop device.

18. A pressure regulator for a supercharged internal combustion engine having a throttle valve comprising, in combination, manually operable means for moving the throttle valve and for selecting an engine intake pressure to be maintained, an engine-intake-pressure-sensitive element, a servo-motor capable of adding to the manually-effected movement of the throttle valve a movement required to bring the throttle valve into substantially wide open position at critical altitude when the manually operable means is in a certain low-pressure-selecting-position and a movement which is greater than necessary when the manually operable means is in positions selecting higher pressures, means for controlling the servo-motor under joint control by the manually operable means and by said element whereby the throttle valve is moved by the servo-motor to compensate for deviations of intake pressure from selected pressure, a selector member operable by said manually operable means to select a desired engine intake pressure, operating means engaging the selector member and operable upon movements of said member to adjust the datum of said pressure sensitive element, a stop device operable to prevent the operation of the servo motor in a direction to effect opening of the throttle valve when said valve reaches wide open position, said pressure sensitive element being operative, when said stop device is effective, to move said last named operating means out of engagement with said selector member upon a reduction in engine intake pressure which would tend to cause a further movement of the servo-motor in the direction in which it moves to open the throttle.

19. A pressure regulator for a supercharged internal combustion engine having a throttle valve comprising, in combination, manually operable means for moving the throttle valve and for selecting an engine intake pressure to be maintained, an engine-intake-pressure-sensitive element, a servo-motor capable of adding to the manually effected movement of the throttle valve a movement required to bring the throttle valve into substantially wide-open position at critical altitude when the manually operable means is in a certain low-pressure-selecting-position and a movement which is greater than necessary when the manually operable means is in positions selecting higher pressures, means for controlling the servo-motor under joint control by the manually operable means and by said element whereby the throttle valve is moved by the servo-motor to compensate for deviations of intake pressure from selected pressure, a selector cam operable by said manually operable means to select a desired engine intake pressure, operating means engaging the cam and operable upon movements of the cam to adjust the datum of said pressure sensitive element, a stop device operable to prevent the operation of the servo-motor in a direction to effect opening of the throttle valve when said valve reaches wide open position, said pressure sensitive element being operative, when said stop device is effective, to move said last named operating means out of engagement with the selector cam upon a reduction in engine intake pressure which would tend to cause a further movement of the servo motor in the direction in which it moves to open the throttle.

20. A pressure regulator for a supercharged internal combustion engine having a throttle valve comprising, in combination, manually operable means for moving the throttle valve and for selecting an engine intake pressure to be maintained, an engine-intake-pressure-sensitive element, a servo-motor capable of adding to the manually effected movement of the throttle valve a movement required to bring the throttle valve into substantially wide open position at critical altitude when the manually operable means is in a certain low-pressure-selecting-position and a movement which is greater than necessary when the manually operable means is in positions selecting higher pressures, means for controlling the servo-motor under joint control by the manually operable means and by said element whereby the throttle valve is moved by the servo-motor to compensate for deviations of intake pressure from selected pressure, means for controlling the operation of said servo motor including a sleeve having ports for supplying fluid under pressure to said servo motor and a valve slidable in said cylinder and controlling said ports, means through which said pressure sensitive element automatically operates said valve upon changes in engine intake pressure to cause said servo-motor to move the throttle valve toward open or closed position, means operable when the throttle is moved to a predetermined open position to engage said valve in order to prevent any further operation of the servo-motor in the direction in which it moves to open said throttle, and means operated by the servo-motor to move said valve engaging means into valve engaging position.

CLARENCE H. JORGENSEN.
LAWRENCE C. DERMOND.

REFERENCES CITED

The following references are of record in the file of this patent:

UNITED STATES PATENTS

| Number | Name | Date |
| --- | --- | --- |
| 2,217,364 | Halford et al. | Oct. 8, 1941 |
| 2,228,239 | Ammann | Jan. 14, 1941 |
| 2,398,586 | Maddox | Apr. 16, 1946 |
| 2,400,306 | Hobbs | May 14, 1946 |
| 2,400,307 | Hobbs et al. | May 14, 1946 |